UNITED STATES PATENT OFFICE.

WILLIAM M. FLETCHER, OF VICKSBURG, MISSISSIPPI.

COMPOUND FOR DESTROYING VEGETATION.

SPECIFICATION forming part of Letters Patent No. 602,739, dated April 19, 1898.

Application filed November 17, 1897. Serial No. 658,814. (No specimens.)

*To all whom it may concern:*

Be it known that I, WILLIAM M. FLETCHER, a citizen of the United States, residing at Vicksburg, in the county of Warren and State of Mississippi, have invented new and useful Improvements in Compounds for Destroying Vegetation, of which the following is a specification.

This invention relates to a compound for destroying vegetation, and has for its object to provide an inexpensive and novel liquid compound which when applied to growing vegetation will effectually kill the same and also serve to prevent its future growth.

To this end the invention consists in the novel compound hereinafter described, and particularly pointed out in the claims.

Heretofore great difficulty has been experienced in keeping down the growth of vegetation in undesirable places, and especially of grass and weeds along the road-bed of railways, and though several compounds and substances have been used for the purpose with more or less success the expense attendant upon their use has heretofore been too great to render their employment perfectly practical. To thoroughly destroy the growing vegetation and prevent its future growth, I have invented a compound consisting of sea-water, petroleum, and crude carbolic acid mixed together, and I have learned by experiment that the proportions of the ingredients for producing the best results at the least expense are as follows: sea-water, ten gallons; petroleum, one gallon, and crude carbolic acid, one quart. This compound is sprayed upon the vegetation and effectually exterminates the same and renders the soil unsuitable for its further propagation. Both the petroleum and crude carbolic acid are very inexpensive, and inasmuch as the sea-water forms a very large part of the bulk of the compound, the latter may be procured at very little cost.

The compound may be sprayed over the vegetation by any suitable spraying device—such as a street-sprinkler, a portable hand-sprinkler, or an ordinary tank-car provided with a suitable spraying attachment—or by any other suitable or preferred means best for the purpose in hand.

The growth of grass and weeds along the road-beds of railways has long proven a source of great annoyance, trouble, and even danger, obstructing the tracks and often throwing the rails and ties out of true, and interfering with the working of the switch points and rails and choking up the frogs. Another source of danger and expense arising from this vegetable growth is due to the attraction it offers to cattle as an article of food, which graze on the growth to the great risk of their own lives and imminent danger of wrecking or injuring the trains, thus entailing serious loss to the railway company. My novel compound not only kills the vegetation and renders the soil unfit for its propagation, but it imparts to it a bitter taste, rendering it unpalatable and unattractive to the cattle, and hence it ceases to attract them.

As has been before stated, the cost of the petroleum and crude carbolic acid is very small, and as by far the larger part of the compound consists of sea-water, the cost of which is merely the cost of its withdrawal from the sea, the compound is produced very cheaply, and by its economical distribution, with the aid of my improved apparatus, the grass and weeds can be exterminated and prevented from again coming up at slight expense.

Having described my invention, what I claim is—

1. A compound for exterminating vegetation, consisting of salt water, petroleum and carbolic acid.

2. A compound for exterminating vegetation, consisting of sea-water, petroleum and crude carbolic acid combined in substantially the proportions specified.

In testimony whereof I have hereunto set my hand in presence of two subscribing witnesses.

WILLIAM M. FLETCHER.

Witnesses:
S. E. TREANOR,
M. J. DONOVAN.